US009059964B2

(12) United States Patent
Barrett

(10) Patent No.: US 9,059,964 B2
(45) Date of Patent: Jun. 16, 2015

(54) METHOD AND SYSTEM FOR COMMUNICATION BETWEEN APPLICATION AND WEB-PAGE EMBEDDED CODE

(71) Applicant: VMware, Inc., Palo Alto, CA (US)

(72) Inventor: Blake R. Barrett, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/451,222

(22) Filed: Aug. 4, 2014

(65) Prior Publication Data
US 2014/0344347 A1    Nov. 20, 2014

Related U.S. Application Data

(63) Continuation of application No. 13/629,466, filed on Sep. 27, 2012, now Pat. No. 8,799,921.

(51) Int. Cl.
*G06F 13/00* (2006.01)
*H04L 29/08* (2006.01)
*G06F 9/54* (2006.01)

(52) U.S. Cl.
CPC  *H04L 67/02* (2013.01); *G06F 9/54* (2013.01); *G06F 9/544* (2013.01); *H04L 67/1097* (2013.01)

(58) Field of Classification Search
CPC .................................. G06F 9/544; G06F 9/547
USPC .................................................... 719/311, 312
See application file for complete search history.

(56) References Cited

U.S. PATENT DOCUMENTS

| | | | |
|---|---|---|---|
| 7,171,614 B2 * | 1/2007 | Allor | 715/205 |
| 7,216,351 B1 * | 5/2007 | Maes | 719/328 |
| 8,527,752 B2 | 9/2013 | Hardt | |
| 2009/0235282 A1 * | 9/2009 | Meijer et al. | 719/320 |
| 2010/0058177 A1 | 3/2010 | Engel et al. | |
| 2010/0235762 A1 * | 9/2010 | Laiho et al. | 715/753 |

* cited by examiner

*Primary Examiner* — Andy Ho

(57) ABSTRACT

One embodiment of the present invention provides a system that facilitates communication between an embedded code in a web page and a stand-alone application. During operation, the system first embeds a code within a web page that is displayed in a browser. Next, the embedded code receives information indicating a communication method provided by a stand-alone application, via a first communication channel. The embedded code subsequently sends the contextual information associated with a user browser session by calling the communication method, via a second communication channel, thereby allowing the stand-alone application to inherit the contextual information from the web browser.

21 Claims, 6 Drawing Sheets

METHOD AND SYSTEM FOR COMMUNICATION BETWEEN APPLICATION AND WEB-PAGE EMBEDDED CODE

RELATED APPLICATION

This application is a continuation of U.S. patent application Ser. No. 13/629,466 filed Sep. 27, 2012 and entitled "Method and System for Communication between Application and Web-page Embedded Code," by Blake R. Barrett, the contents of which are hereby incorporated by reference herein.

BACKGROUND

Over the past few years social networking has become an important tool for a user to stay connected with peers. A social networking site hosting and sharing data can be for general purposes, connecting people with different interests and covering a wide range of locations. There can also be social networking sites that connect people with specific interests. For example, a social networking site can connect people with keen interest on photography, connect job seekers and recruiters, or connect employees within a large enterprise, and so on.

These social networking sites typically run through a user's web browser. Recently, there have been also stand-alone applications for some of the popular social networking sites. These applications can keep the user logged into the online community and generate pop-up messages for the user when the user closes a browser session or directs the browser to a different website.

Often, a user may want to move from a browser session to a stand-alone application and continue to participate in the same online community. Migrating from a browser session to a stand-alone application typically requires the same contextual information (e.g., the uniform resource locator (URL) of the online community and user information) to be present in the stand-alone application. A common challenge involved in this challenge is how to communicate this contextual information from the browser to the stand-alone application without requiring the user to enter the information manually (such as typing or pasting the URL into the stand-alone application). For example, consider an online forum for the employees of an enterprise. When a user authenticated to use the forum via a web browser wishes to continue to access the forum in a stand-alone application and not have to leave a browser tab open; the user often must re-enter the forum's URL they wish to join into the stand-alone application, before providing his security credentials.

SUMMARY

One embodiment of the present invention provides a system that facilitates communication between an embedded code in a web page and a stand-alone application. During operation, the system first embeds code within a web page that is displayed in a browser. Next, the embedded code receives information indicating a communication method provided by a stand-alone application, via a first communication channel. The embedded code subsequently sends the contextual information associated with a user browser session by calling the communication method, via a second communication channel. This way, the communication between the embedded code and the stand-alone application allows the stand-alone application to inherit the contextual information from the web browser.

In a variation on this embodiment, the information indicating the communication method includes a random string generated by the stand-alone application.

In a variation on this embodiment, the first communication channel is a local channel based on shared memory in a computer where the stand-alone application and the embedded code reside.

In a variation on this embodiment, while receiving information indicating a communication method provided by the stand-alone application, the embedded code subscribes to the first channel.

In a variation on this embodiment, the stand-alone application is a sender and the embedded code is a listener on the first communication channel.

In a variation on this embodiment, the embedded code is a sender and the stand-alone application is a listener on the second communication channel.

In a variation on this embodiment, the contextual information includes user subscription information or server domain information or both.

DETAILED DESCRIPTION

Figure 1:
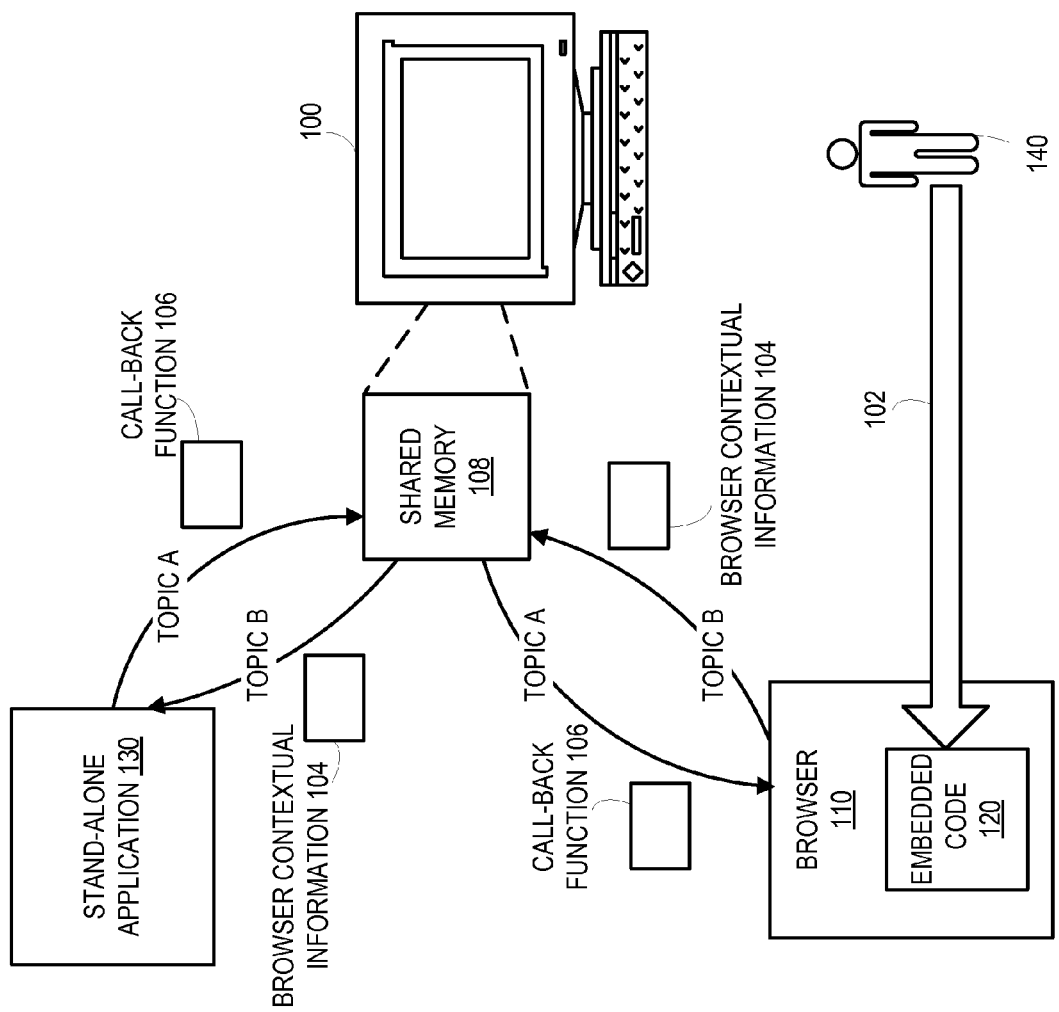
FIG. 1 presents a block diagram illustrating how a code embedded in a web page and executing in a browser communicates with a stand-alone application communicate using a shared memory, in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments described herein solve the problem of securely communicating the contextual information of a web browsing session from a web browser to a stand-alone application by facilitating two local one-way communication channels between an embedded code in the web page and the stand-alone application.

During operation, a user issues a command to install and/or start the stand-alone application. In response, the stand-alone application starts and publishes a message via a first local communication channel, which, for example, can be implemented in shared memory and allows a running thread to publish messages. This published message includes a command that calls a known function provided by the embedded code and passes as an argument the name of a uniquely identifiable call-back function.

Subsequently, the embedded code reads from this first channel, executes the known function, and obtains the name of the uniquely identifiable call-back function. The embedded code then publishes a second message on a second channel. This second message includes a command that calls the uniquely identifiable call-back function and passes the contextual information of the web browsing session (such as the URL of an online community) as an argument of the call-back function. In response, the stand-alone application reads from the second channel, executes the command, and receives the contextual information.

Once the contextual information is passed from the embedded code to the stand-alone application, the system can shut down the communication channels and the stand-alone application can proceed to authenticate the user using the inherited contextual information. This way, the user does not need to manually enter the browser's contextual information into the stand-alone application.

In some embodiments, the embedded code and the stand-alone application can both execute in a cross-platform runtime environment, such as the Adobe Integrated Runtime (Adobe AIR). Such a runtime environment can allow the embedded code (which can be in Adobe SWF format) to communicate with the stand-alone application (which can also be in SWF format) via shared memory.

Although the present disclosure uses the examples of SWF codes, embodiments described herein are not limited to SWF codes and are applicable to any two applications running on the same computing device, including but not limited to, desktop computers, notebook computers, netbook computers, tablets, etc.

The term "browser contextual information" is used in a generic sense and refers to any information pertaining to a user's web browser session. Such contextual information can include but is not limited to: URL, user name, session state, authentication status, etc.

As previously discussed, embodiments described herein provide a method of communication between an embedded code in a web page and a stand-alone application. When a browser displays a web page, the embedded code starts executing. The embedded code communicates with the stand-alone application using two communication channels. On the first communication channel, which can be implemented as a first topic in a shared-memory communication mechanism provided by Adobe AIR, the stand-alone application publishes, and the embedded code "listens." On this first channel, the embedded code receives information related to method call-back function from the stand-alone application. On a second channel, which can be implemented as a second topic in the shared-memory communication mechanism, the embedded code publishes and the stand-alone application "listens." On this second channel, the embedded code calls the call-back function and passes the user's browser contextual information as an argument to the stand-alone application.

In some embodiments, to improve security of the communication, the stand-alone application can dynamically generate the name of the call-back function by, for example, including a random string therein.

FIG. 1 presents a block diagram illustrating how a code embedded in a web page and executing in a browser communicates with a stand-alone application communicate using a shared memory, in accordance with an embodiment. A computing device 100 hosts a web browser 110 and a stand-alone application 130. Browser 110 displays a web page that runs a code 120 embedded in the web page. During operation, computing device 100 receives a command 102 (which, in one embodiment, can be issued to embedded code 120) to start a stand-alone application 130 from a user 140. Shared memory 108 facilitates two communication channels, one under "TOPIC A" and the other under "TOPIC B." Under TOPIC A, stand-alone application 130 publishes and embedded code 120 listens. Under TOPIC B, embedded code 120 publishes, and stand-alone application 130 listens.

Initially, stand-alone application 130 passes information regarding a call-back function 106 to embedded code 120. In one embodiment, stand-alone application 130 passes the name of call-back function 106 as an argument of a known function, and publishes a call to this function under TOPIC_A. Embedded code 120 then receives the call, executes the called function, and obtains the name of call back function 106. In response, embedded code 120 publishes a call to call-back function 106 under TOPIC_B and passes browser contextual information 104 (such as a URL, user information, and session state information, etc.) as an argument of call-back function 106. As a result, stand-alone application receives this call to call-back function 106, executes call-back function 106, and obtains browser contextual information 104.

Figure 2:
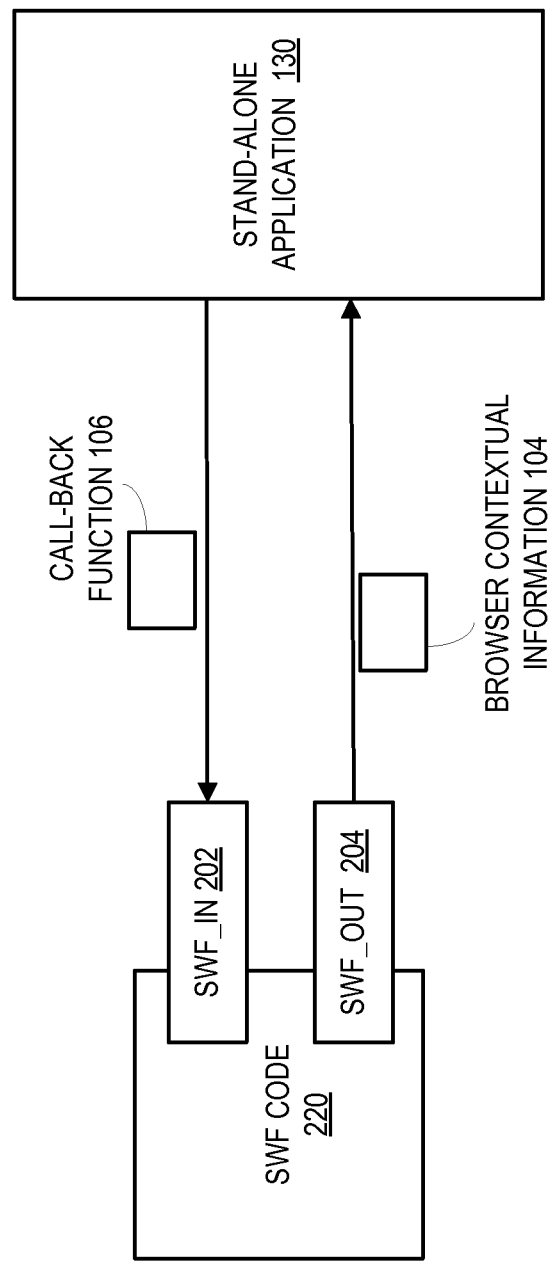
FIG. 2 illustrates how the system implements two-way communication between a web-page embedded SWF code and a stand-alone application over two separate local communication channels, in accordance with an embodiment.

FIG. 2 illustrates how the system implements two-way communication between a web-page embedded SWF code and a stand-alone application over two separate local communication channels, in accordance with an embodiment. In this example, embedded code 120 is a SWF code 220. SWF code 220 listens under topic "SWF_IN" in the shared memory, which effectively serves as an input channel 202. SWF code 220 also publishes under topic "SWF_OUT" in the shared memory, which effectively serves as an output channel 204. Stand-alone application 130 "talks" to SWF code 220 on input channel 202 and passes the name of call-back function 106. In response, SWF code 220 communicates back to stand-alone application 130 browser contextual information 104 by calling call-back function 106 over output channel 204.

Figure 3:
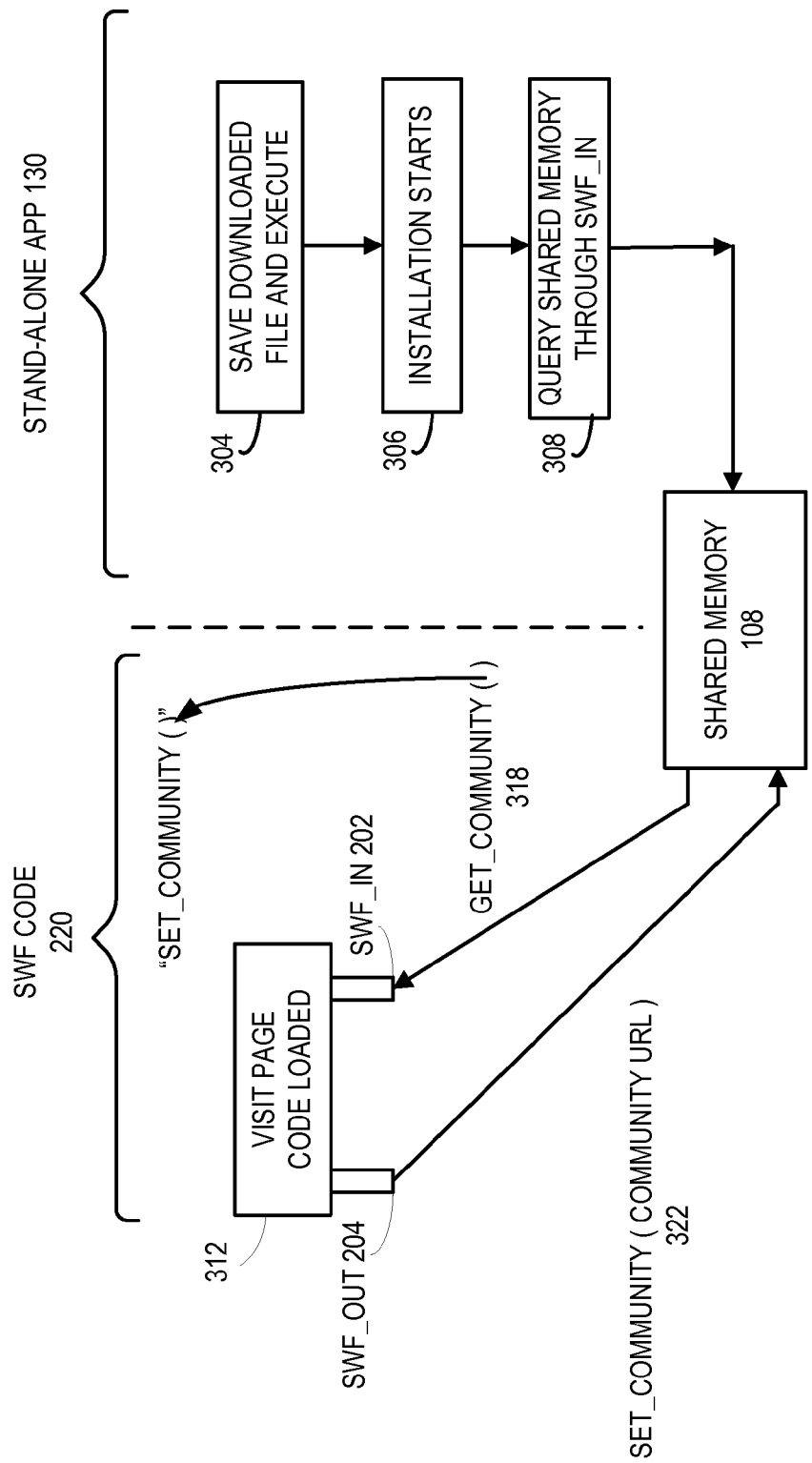
FIG. 3 illustrates an exemplary process of establishing two-way communication between a stand-alone application and an embedded code, in accordance with an embodiment.

FIG. 3 illustrates an exemplary process of establishing two-way communication between a stand-alone application and an embedded code, in accordance with an embodiment. During operation, SWF code 220 is loaded when a user visits the web page that embeds the code (operation 312). Stand-alone application 130 on the other hand is installed (operation 306) after the user downloads a file and executes the downloaded file (operation 304). Stand-alone application 130 then queries SWF code 220 under topic SWF_IN via shared memory 108. In one embodiment, stand-alone application 130 publishes a call to a known function, GET_COMMUNITY ( ) which has as its argument the name of call-back function 106, "SET_COMMUNITY ( )" (operation 318).

Subsequently, SWF code 220 receives this argument and obtains the name of call-back function 106. In response, SWF code publishes a call to SET_COMMUNITY ( ) and passes the browser contextual information (such as the text of an URL corresponding to an online community) as its argument, under topic SWF_OUT (operation 322). In general, the contextual information can include the user's browser session information and a web server domain information.

Figure 4:
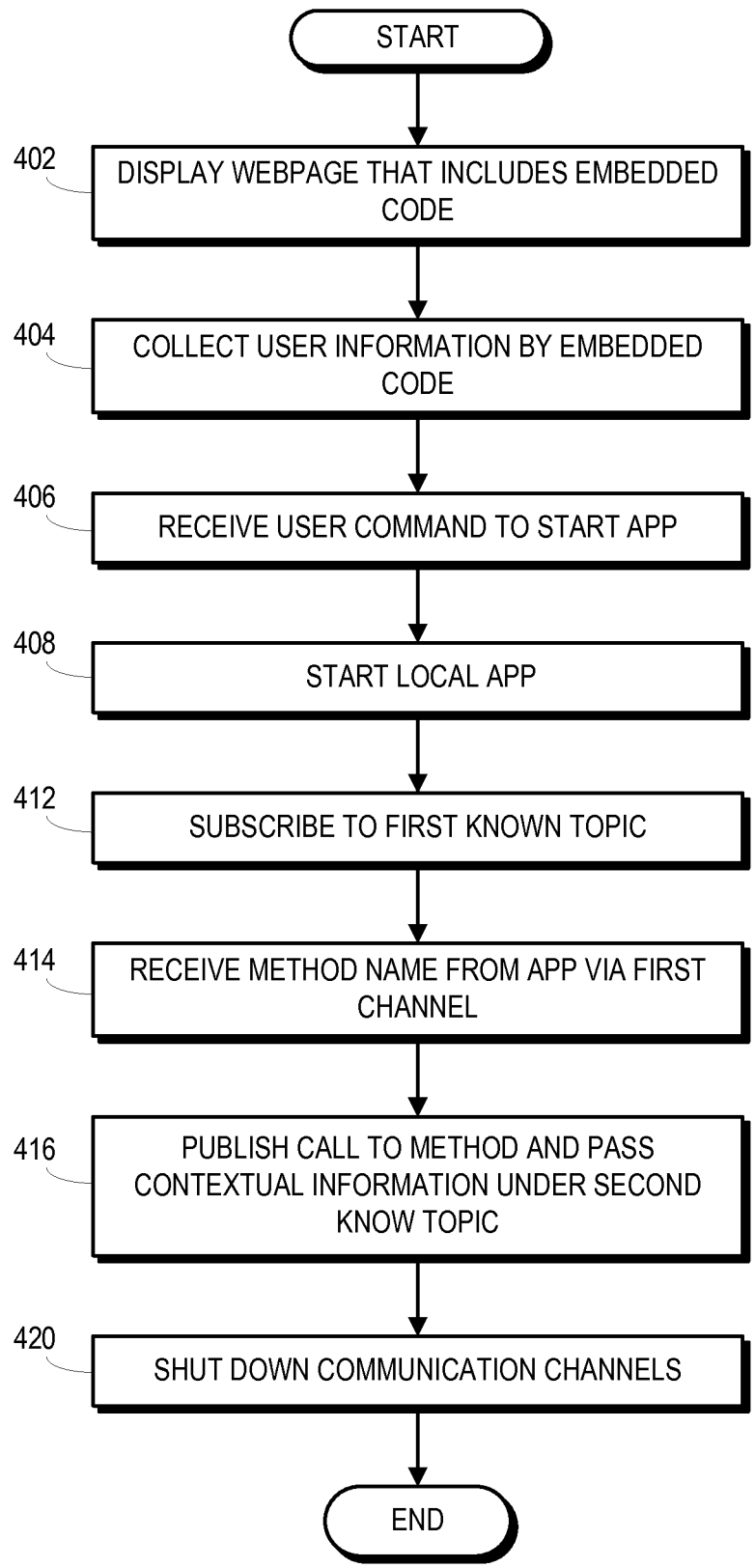
FIG. 4 presents a flowchart illustrating an exemplary process of an embedded code establishing communication with a stand-alone application, in accordance with an embodiment.

FIG. 4 presents a flowchart illustrating an exemplary process of an embedded code establishing communication with a stand-alone application, in accordance with an embodiment. During operation, a user browser displays a web page that includes an embedded code (operation 402). The embedded code executes and collects information about the user's current browsing session (operation 404). Next, the system receives a user command to start a stand-alone application (operation 406). In response to this command, the stand-alone application starts (operation 408). Note that the user command to start the stand-alone application can be received by the embedded code, or received by the operating system via a regular graphical user interface.

Subsequently, the embedded code subscribes to a first known topic in a shared memory (operation 412). The embedded code then receives information regarding a communication method (e.g., the name of a call-back function) from the stand-alone application published under this first topic (operation 414). In response, the embedded code calls the method and passes the user browser contextual information by publishing the call under a second known topic in the shared memory (operation 416). The system then shuts down the communication channels (operation 420).

Figure 5:
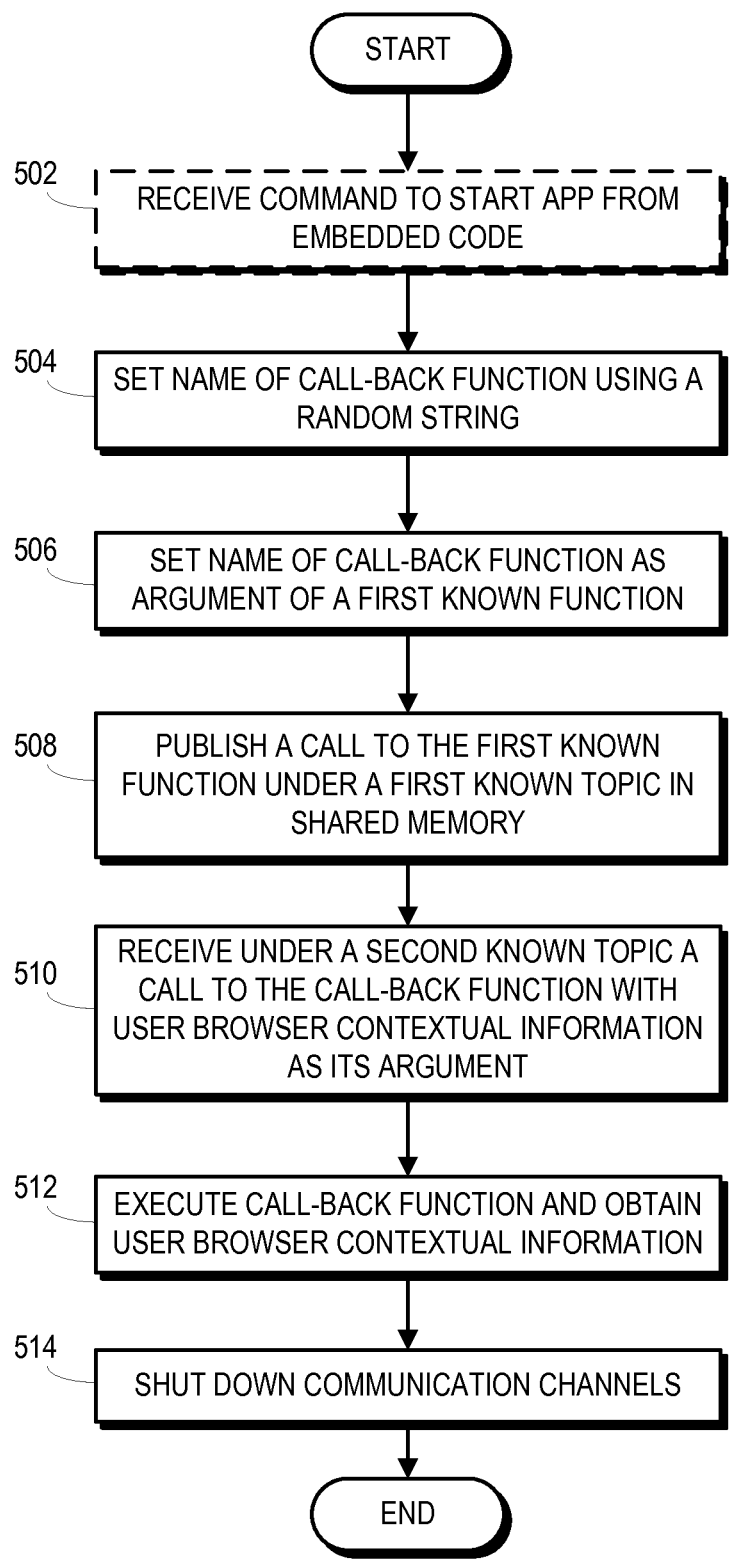
FIG. 5 presents a flowchart illustrating an exemplary process of a stand-alone application establishing communication with an embedded code, in accordance with an embodiment.

FIG. 5 presents a flowchart illustrating an exemplary process of a stand-alone application establishing communication with an embedded code, in accordance with an embodiment. During operation, the system receives a command from an embedded code to start execution (operation 502) (optionally, the command is received by the embedded code). After the stand-alone application starts, it sets the name of a call-back function, using a random string (operation 504). Note that this call-back function can be used by the embedded code to communicate information back to the stand-alone application. Next, the stand-alone application sets the name of the call-back function as the argument of a first known function (operation 506). This first known function is provided by embedded code and is assumed to be known by the stand-alone application.

Subsequently, the stand-alone application publishes a call to the first known function under a first known topic in a shared memory (operation 508). Because the argument of this function call is the name of the call-back function, the embedded code can obtain the name of the call-back function by executing this call, and publish under a second known topic a call to the call-back function with the user's browser contextual information as an argument to the call-back function. Correspondingly, the stand-alone application receives under the second known topic the call to the call-back function with user browser contextual information as its argument (operation 510). In response, the stand-alone application then executes the call-back function and obtains the user browser contextual information (operation 512). The system then shuts down the two-way communication channels (operation 514).

Figure 6:
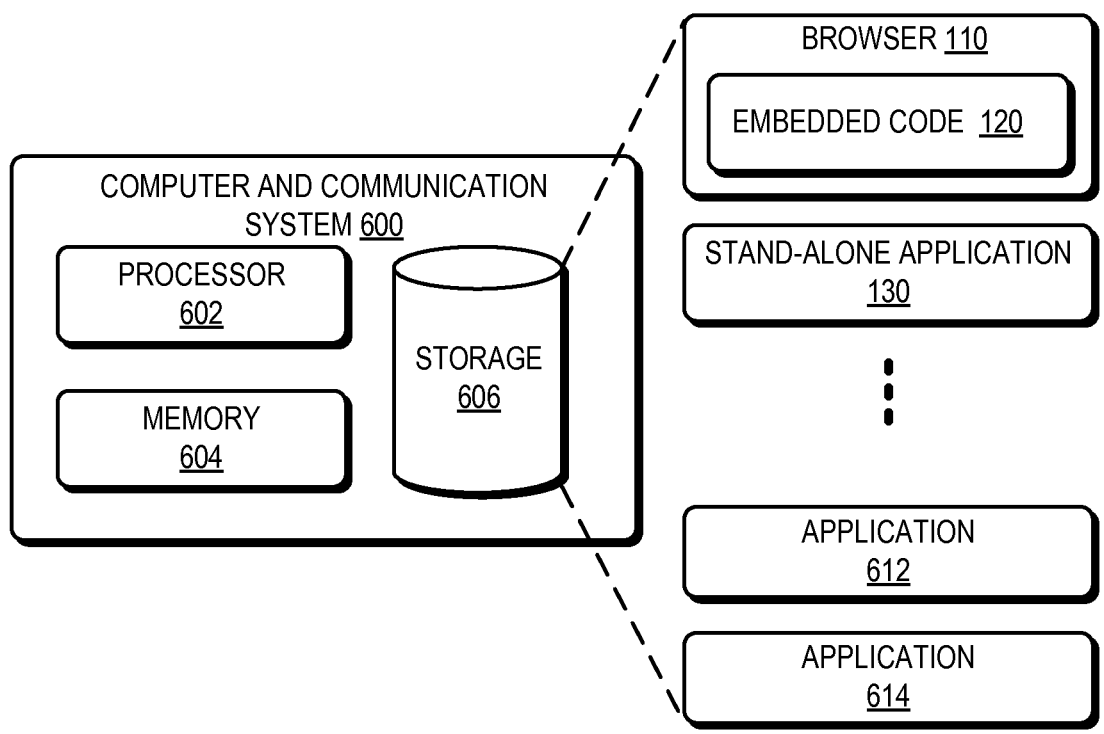
FIG. 6 presents a diagram illustrating an exemplary system for implementing components to facilitate communication between an embedded code and a stand-alone application, in accordance with one embodiment.

FIG. 6 presents a diagram illustrating an exemplary system for implementing components to facilitate communication between an embedded code and a stand-alone application, in accordance with one embodiment. In this example, a computer and communication system 600 includes a processor 602, a memory 604, and a storage device 606. Storage device 606 stores instructions which implement web browser 110. Web browser 110 in turn displays a web page that includes embedded code 120. Storage device 606 also stores instructions for stand-alone application 130, as well as other applications, such as applications 130 and 612. Instructions for embedded code 120 and stand-alone application 130 are loaded from storage device 606 into memory 604 and then executed by processor 602. While executing the program, processor 602 performs the aforementioned operations.

Note that the above-mentioned components can be implemented in hardware as well as in software. In some embodiments, one or more of these components can be embodied in computer-executable instructions stored in a memory which is coupled to one or more processors in system 600. When executed, these instructions cause the processor(s) to perform the aforementioned functions.

The data structures and code described in this detailed description can be stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executed method, comprising:
communicating information indicating a communication method to a code being executed in a web browser session; and
receiving, from the code being executed in the web browser session, contextual information associated with the web browser session via the communication method, thereby facilitating an application that is distinct from the web browser session to execute using contextual information inherited from the web browser session.

2. The communication method of claim 1, wherein communicating information indicating the communication method to the code being executed in the web browser session comprises passing a name of the communication method as an argument for a known function associated with the code and publishing a call to the known function to a memory region that can be read by the code.

3. The method of claim 1, wherein receiving contextual information from the code being executed in the web browser session comprises receiving a call to the communication method;
wherein the call to the communication method is written by the code to a shared memory region; and
wherein the contextual information is passed as an argument for the communication method.

4. The method of claim 1, further comprising generating a name for the communication method using a random string.

5. The method of claim 1, wherein the application is downloaded in the same web browser session.

6. The method of claim 1, further comprising allowing the web browser session to initiate installation of the application.

7. The method of claim 1, wherein the contextual information comprises user subscription information, server domain information, or both.

8. A computer readable non-transitory storage medium storing instructions which when executed by computer cause the computer to perform a method, the method comprising:
communicating information indicating a communication method to a code being executed in a web browser session; and
receiving, from the code being executed in the web browser session, contextual information associated with the web browser session via the communication method, thereby facilitating an application that is distinct from the web browser session to execute using contextual information inherited from the web browser session.

9. The computer readable non-transitory storage medium of claim 8, communicating information indicating the communication method to the code being executed in the web browser session comprises passing a name of the communication method as an argument for a known function associated with the code and publishing a call to the known function to a memory region that can be read by the code.

10. The computer-readable non-transitory storage medium of claim 8, wherein receiving contextual information from the code being executed in the web browser session comprises receiving a call to the communication method;
wherein the call to the communication method is written by the code to a shared memory region; and
wherein the contextual information is passed as an argument for the communication method.

11. The computer-readable non-transitory storage medium of claim 8, wherein the method further comprises generating a name for the communication method using a random string.

12. The computer-readable non-transitory storage medium of claim 8, wherein the application is downloaded in the same web browser session.

13. The computer-readable non-transitory storage medium of claim 8, wherein method further comprises allowing the web browser session to initiate installation of the application.

14. The computer-readable non-transitory storage medium of claim 8, wherein the contextual information comprises user subscription information, server domain information, or both.

15. A computing system, comprising:
a processor; and
a memory coupled to the processor, wherein the memory stores instructions which when executed by the processor cause the processor to perform a method, the method comprising:
communicating information indicating a communication method to a code being executed in a web browser session; and
receiving, from the code being executed in the web browser session, contextual information associated with the web browser session via the communication method, thereby facilitating an application that is distinct from the web browser session to execute using contextual information inherited from the web browser session.

16. The computing system of claim 15, wherein communicating information indicating the communication method to the code being executed in the web browser session comprises passing a name of the communication method as an argument for a known function associated with the code and publishing a call to the known function to a memory region that can be read by the code.

17. The computing system of claim 15, wherein receiving contextual information from the code being executed in the web browser session comprises receiving a call to the communication method;
wherein the call to the communication method is written by the code to a shared memory region; and
wherein the contextual information is passed as an argument for the communication method.

18. The computing system of claim 15, wherein the method further comprises generating a name for the communication method using a random string.

19. The computing system of claim 15, wherein the application is downloaded in the same web browser session.

20. The computing system of claim 15, wherein the method further comprises allowing the web browser session to initiate installation of the application.

21. The computing system of claim 15, wherein the contextual information comprises user subscription information, server domain information, or both.

* * * * *